(12) United States Patent
Fujishita et al.

(10) Patent No.: US 10,863,785 B2
(45) Date of Patent: Dec. 15, 2020

(54) GLOVE

(71) Applicant: DIC Corporation, Tokyo (JP)

(72) Inventors: Norie Fujishita, Osaka (JP); Hiroki Tanaka, Osaka (JP)

(73) Assignee: DIC CORPORATION, Tokyo (JP)

( * ) Notice: Subject to any disclaimer, the term of this patent is extended or adjusted under 35 U.S.C. 154(b) by 158 days.

(21) Appl. No.: 16/090,070

(22) PCT Filed: Feb. 16, 2017

(86) PCT No.: PCT/JP2017/005658
§ 371 (c)(1),
(2) Date: Sep. 28, 2018

(87) PCT Pub. No.: WO2017/183271
PCT Pub. Date: Oct. 26, 2017

(65) Prior Publication Data
US 2019/0110535 A1 Apr. 18, 2019

(30) Foreign Application Priority Data

Apr. 19, 2016 (JP) ................................. 2016-083682

(51) Int. Cl.
| | | |
|---|---|---|
| *C08K 5/00* | (2006.01) | |
| *A41D 19/015* | (2006.01) | |
| *C08L 33/16* | (2006.01) | |
| *C08L 75/04* | (2006.01) | |
| *A41D 19/00* | (2006.01) | |
| *C08F 220/22* | (2006.01) | |
| *C08K 3/013* | (2018.01) | |
| *C08K 5/5419* | (2006.01) | |

(52) U.S. Cl.
CPC ............ *A41D 19/015* (2013.01); *A41D 19/00* (2013.01); *A41D 19/0055* (2013.01); *C08F 220/22* (2013.01); *C08L 33/16* (2013.01); *C08L 75/04* (2013.01); *A41D 2400/80* (2013.01); *A41D 2500/50* (2013.01); *A41D 2500/54* (2013.01); *C08K 3/013* (2018.01); *C08K 5/0075* (2013.01); *C08K 5/5419* (2013.01); *C08L 2201/54* (2013.01)

(58) Field of Classification Search
CPC .. A41D 19/015; A41D 19/00; A41D 19/0055; A41D 2500/54; A41D 2500/50; A41D 2400/80; C08F 220/22; C08K 3/013; C08K 5/0075; C08K 5/5419; C08L 33/16; C08L 75/04; C08L 2201/54
See application file for complete search history.

(56) References Cited

U.S. PATENT DOCUMENTS 6,465,591 B1 * 10/2002 Lee ........................ C08F 220/22
526/264
2009/0012208 A1 * 1/2009 Madsen ................. C09J 139/06
523/113

FOREIGN PATENT DOCUMENTS

JP      2001-123306 A     5/2001

OTHER PUBLICATIONS

International Search Report issued in corresponding International Patent Application No. PCT/JP2017/005658, dated May 9, 2017, with English Translation.

* cited by examiner

*Primary Examiner* — Patrick D Niland
(74) *Attorney, Agent, or Firm* — McDermott Will & Emery LLP

(57) ABSTRACT

The present invention provides a glove having a skin made from an aqueous urethane resin composition including an aqueous urethane resin (A), an aqueous medium (B), and a fluorine compound (C), in which the fluorine compound (C) is a fluorine compound (C-1) that is a polymer of a polymerizable monomer (c1-1) having a fluorinated alkyl group having 4 to 6 carbon atoms and a polymerizable monomer (c1-2) having a polyoxyethylene structure represented by general formula (2), or a fluorine compound (C-2) that is a polymer of a polymerizable monomer (c2-1) having a polymerizable unsaturated group at both ends of a poly (perfluoroalkylene ether) chain and a polymerizable monomer (c2-2) having a polyoxyalkylene structure represented by general formula (4).

5 Claims, No Drawings

GLOVE

CROSS REFERENCE TO RELATED APPLICATIONS

This application is the U.S. National Phase under 35 U.S.C. § 371 of International Application No. PCT/JP2017/005658, filed on Feb. 16, 2017, which claims the benefit of Japanese Application No. 2016-083682, filed on Apr. 19, 2016, the entire contents of each are hereby incorporated by reference.

TECHNICAL FIELD

The present invention relates to a glove having a skin of an aqueous urethane resin composition.

BACKGROUND ART

Natural gums and synthetic gums such as nitrile gums which are used as materials having elasticity generally have a risk to cause allergy by contact, and thus the use thereof may be avoided in glove applications. As alternative materials, solvent-type urethane resins which have rubber elasticity and are relatively soft are widely used.

On the other hand, with the recently increasing social momentum toward needs for environmentally conscious products, transfer from solvent-based urethane resins to aqueous urethane resins is also required in the glove applications.

As a glove produced using such an aqueous urethane resin, for example, gloves produced using an aqueous dispersion resin liquid containing an aqueous urethane and an organic filler are known (see, for example, PTL 1). However, when a skin of such an aqueous urethane resin is formed outside a glove, there is a problem of poor grip (non-slip) properties.

Industrial gloves are currently used in a wide variety of applications. For example, in applications in which engineering products having machine oil adhered are handled, gloves are required to have superior oil grip properties for holding engineering components without slippage even when machine oil is adhered to the gloves.

CITATION LIST

Patent Literatures

PTL 1: JP-A-2001-123306

SUMMARY OF INVENTION

Technical Problem

A problem that the present invention is to solve is to provide a glove having increased oil grip properties by using an aqueous urethane resin.

Solution to Problem

The present invention provides a glove having a skin made from an aqueous urethane resin composition including an aqueous urethane resin (A), an aqueous medium (B), and a fluorine compound (C), in which the fluorine compound (C) is a fluorine compound (C-1) that is a polymer of a polymerizable monomer (c1-1) having a fluorinated alkyl group having 4 to 6 carbon atoms and a polymerizable monomer (c1-2) having a polyoxyethylene structure represented by the following general formula (2), or the fluorine compound (C) is a fluorine compound (C-2) that is a polymer of a polymerizable monomer (c2-1) having a polymerizable unsaturated group at both ends of a poly(perfluoroalkylene ether) chain and a polymerizable monomer (c2-2) having a polyoxyalkylene structure represented by the following general formula (4).

[Chem. 1]

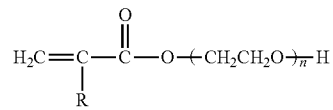

(2)

In the formula (2), R represents a hydrogen atom or a methyl group, and n represents an integer in the range of 1 to 30.

[Chem. 2]

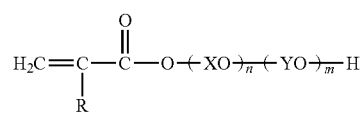

(4)

In the formula (4), R represents a hydrogen atom or a methyl group, X and Y each independently represent an alkylene group, and n and m each independently represent 0 or an integer in the range of 1 to 30, provided that the sum of n and m is equal to or more than 1.

Advantageous Effect of Invention

The glove of the present invention is superior in oil grip properties. Since an aqueous urethane resin composition is used, environmental burdens in production of the glove are also small. Accordingly, the glove of the present invention can be suitably used as an industrial glove for use in various fields, such as the chemical industry field, food field, and medical field.

DESCRIPTION OF EMBODIMENTS

The glove of the present invention has a skin made from an aqueous urethane resin composition containing an aqueous urethane resin (A), an aqueous medium (B), and a specific fluorine compound (C).

The aqueous urethane resin (A) can be dispersed in the aqueous medium (B) described later, and for example, a resin having a hydrophilic group, such as an anionic group, a cationic group, and a nonionic group; a resin that can be forcibly dispersed in the aqueous medium (B) with an emulsifier; and the like, can be used. The aqueous urethane resins (A) may be used alone or in combination of two or more thereof. Among them, in terms of availability of a starting material, an aqueous urethane resin having a hydrophilic group is preferably used, and an aqueous urethane resin having an anionic group which has the best aqueous dispersion stability is more preferably used.

An example of methods for obtaining the aqueous urethane resin having an anionic group is a method in which one or more compounds selected from the group consisting of compounds having a carboxyl group and compounds having a sulfonyl group are used as starting materials. Among them, in terms of obtaining further superior aqueous dispersion stability and oil grip properties, a compound having a carboxyl group and/or a compound having a sulfonyl group is preferably used.

As the compound having a carboxyl group, for example, 2,2-dimethylolpropionic acid, 2,2-dimethylolbutanoic acid, 2,2-dimethylolbutyric acid, and 2,2-valeic acid can be used. These compounds may be used alone or in combination of two or more thereof.

As the compound having a sulfonyl group, for example, 3,4-diaminobutane sulfonic acid, 3,6-diamino-2-toluene sulfonic acid, 2,6-diaminobenzene sulfonic acid, and N-(2-aminoethyl)-2-aminoethyl sulfonic acid can be used. These compounds may be used alone or in combination of two or more thereof.

All or parts of the carboxyl groups and the sulfonyl groups may be neutralized with basic compounds in the aqueous urethane resin composition. As the basic compound, for example, organic amines, such as ammonia, triethylamine, pyridine, and morpholine; alkanol amines, such as monoethanolamine and dimethylethanolamine; metallic basic compounds containing sodium, potassium, lithium, calcium, or the like can be used.

An example of methods for obtaining the aqueous urethane resin having a cationic group is a method in which one or two or more compounds having an amino group are used as starting materials.

As the compound having an amino group, for example, compounds having a primary and a secondary amino group, such as triethylene tetramine and diethylene triamine; and compounds having a tertiary amino group, such as N-alkyldialkanolamines, for example, N-methyldiethanolamine and N-ethyldiethanolamine, N-alkyldiaminoalkylamines, for example, N-methyldiaminoethylamine and N-ethyldiaminoethylamine can be used. These compounds may be used alone or in combination of two or more thereof.

An example of methods for obtaining the aqueous urethane resin having a nonionic group is a method in which one or two or more compounds having an oxyethylene structure are used as starting materials.

As the compound having an oxyethylene structure, for example, polyether polyols having an oxyethylene structure, such as polyoxyethylene glycol, polyoxyethylene polyoxypropylene glycol, and polyoxyethylene polyoxytetramethylene glycol can be used. These compounds may be used alone or in combination of two or more thereof.

As the emulsifier which can be used for obtaining an aqueous urethane resin that can be forcibly dispersed in the aqueous medium (B), for example, nonionic emulsifiers, such as polyoxyethylene nonylphenyl ether, polyoxyethylene lauryl ether, polyoxyethylene styrylphenyl ether, polyoxyethylene sorbitol tetraoleate, and a polyoxyethylene-polyoxypropylene copolymer; anionic emulsifiers, such as fatty acid salts, for example, sodium oleate, alkylsulfuric acid ester salts, alkylbenzene sulfonic acid salts, alkylsulfosuccinic acid salts, naphthalene sulfonic acid salts, polyoxyethylene alkylsulfuric acid salts, alkane sulfonate sodium salts, and alkyl diphenyl ether sulfonic acid sodium salts; and cationic emulsifiers, such as alkylamine salts, alkyltrimethyl ammonium salts, and alkyldimethylbenzyl ammonium salts can be used. These emulsifiers may be used alone or in combination of two or more thereof.

As the aqueous urethane resin (A), specifically, a compound that can be obtained by reacting a polyol (a1), a polyisocyanate (a2), a chain extender (a3), and optionally the aforementioned starting material used for producing the aqueous urethane resin having a hydrophilic group can be used.

As the polyol (a1), for example, a polyether polyol, a polyester polyol, a polyacryl polyol, a polycarbonate polyol, a polybutadiene polyol, the compound having a carboxyl group, the compound having a sulfonyl group, the compound having an amino group, and the compound having an oxyethylene structure can be used. These polyols may be used alone or in combination of two or more thereof. Among them, in terms of further increasing oil grip properties, softness, and chemical resistance, the polyol (a1) preferably contains one or more selected from the group consisting of polyester polyols, polyether polyols, and polycarbonate polyols.

As the polyester polyol, for example, a reaction product of a compound having a hydroxyl group with a polybasic acid can be used.

As the compound having a hydroxyl group, for example, ethylene glycol, propylene glycol, butanediol, pentanediol, hexanediol, heptanediol, octanediol, nonanediol, decanediol, diethylene glycol, dipropylene glycol, neopentyl glycol, 3-methylpentanediol, cyclohexanedimethanol, trimethylolpropane, trimethylolethane, and glycerol can be used. These compounds may be used alone or in combination of two or more thereof.

As the polybasic acid, for example, oxalic acid, malonic acid, succinic acid, adipic acid, sebacic acid, azelaic acid, 1,12-dodecane dicarboxylic acid, maleic acid, glutaric acid, pimelic acid, itaconic acid, chlorendic acid, 1,2,4-butanetricarboxylic acid, chlorendic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-form derivatives of the dicarboxylic acids; p-hydroxybenzoic acid, p-(2-hydroxyethoxy)benzoic acid, and hydroxycarboxylic acids thereof can be used. These compounds may be used alone or in combination of two or more thereof.

In terms of further increasing oil grip properties and softness, the hydroxyl value of the polyester polyol is preferably in the range of 20 to 230 mg KOH/g, and more preferably in the range of 28 to 110 mg KOH/g. The hydroxyl value of the polyester polyol represents a value measured according to JIS K0070-1992.

As the polyether polyol, for example, polyoxyethylene polyol, polyoxypropylene polyol, polyoxytetramethylene polyol, polyoxyethylene polyoxypropylene polyol, polyoxyethylene polyoxytetramethylene polyol, and polyoxypropylene polyoxytetramethylene polyol can be used. These polyether polyols may be used alone or in combination of two or more thereof.

As the polycarbonate polyol, for example, a product obtained through a reaction of a carbonic acid ester and/or phosgene with a compound having two or more hydroxyl groups can be used.

As the carbonic acid ester, for example, methyl carbonate, dimethyl carbonate, ethyl carbonate, diethyl carbonate, cyclocarbonate, and diphenyl carbonate can be used. These carbonic acid esters may be used alone or in combination of two or more thereof.

As the compound having two or more hydroxyl groups, for example, the same as the chain extender having hydroxyl groups can be used. These compounds may be used alone or in combination of two or more thereof. Among them, in terms of further increasing cutting properties, an aliphatic polyol and/or an alicyclic polyol is preferably used, and one or more compounds selected from the group consisting of 1,4-butanediol, 1,5-pentanediol, 1,6-hexanediol, and 1,4-cyclohexanedimethanol are more preferably used.

In terms of further increasing oil grip properties and softness, the total amount of the polyester polyol, polyether polyol, and polycarbonate polyol is preferably 70% by mass or more in the polyol (a1), and more preferably 80% by mass or more.

As the polyisocyanate (a2), for example, aromatic polyisocyanates, such as phenylene diisocyanate, tolylene diisocyanate, diphenylmethane diisocyanate, naphthalene diisocyanate, polymethylene polyphenyl polyisocyanate, and carbodiimide-modified diphenylmethane polyisocyanate; and aliphatic or alicyclic polyisocyanates, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, and norbornene diisocyanate can be used. These polyisocyanate may be used alone or in combination of two or more thereof. Among them, in terms of further increasing oil grip properties and softness, an aromatic polyisocyanate is preferably used, and diphenylmethane diisocyanate is more preferably used.

As the chain extender (a3), for example, chain extenders having an amino group, such as ethylene diamine, 1,2-propane diamine, 1,6-hexamethylene diamine, piperazine, 2,5-dimethyl piperazine, isophorone diamine, 1,2-cyclohexane diamine, 1,3-cyclohexane diamine, 1,4-cyclohexane diamine, 4,4'-dicyclohexylmethane diamine, 3,3'-dimethyl-4,4'-dicyclohexylmethane diamine, and hydrazine; and chain extenders having hydroxyl groups, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerol, sorbitol, bisphenol A, 4,4'-dihydroxydiphenyl, 4,4'-dihydroxydiphenyl ether, and trimethylolpropane can be used. These chain extenders may be used alone or in combination of two or more thereof. Among them, in terms of further increasing oil grip properties and chemical resistance, a chain extender having hydroxyl groups is preferably used.

Examples of methods for producing the aqueous urethane resin (A) include a method in which the polyol (a1), the polyisocyanate (a2), and the chain extender (a3) are mixed in the absence of a solvent or in the presence of an organic solvent, and are reacted at a temperature in the range of 50 to 100° C. for 3 to 15 hours; and a method in which the polyol (a1) and the polyisocyanate (a2) are mixed in the absence of a solvent or in the presence of an organic solvent, and are reacted at a temperature in the range of 50 to 100° C. for 3 to 15 hours to obtain a urethane prepolymer having an isocyanate group, and then the urethane prepolymer and the chain extender (a3) are reacted. An organic solvent was used in the above-mentioned reaction.

The reaction of the polyol (a1), the polyisocyanate (a2), and the chain extender (a3) is preferably performed at an equivalence ratio of the isocyanate groups of the polyisocyanate (a2) to the sum of the hydroxyl groups and amino groups of the polyol (a1) and the chain extender (a3) [isocyanate groups/hydroxyl groups and amino groups] in the range of 0.9 to 1.1, and more preferably in the range of 0.95 to 1.05.

As the organic solvent that can be used in production of the aqueous urethane resin (A), for example, ketone solvents, such as acetone and methyl ethyl ketone; ether solvents, such as tetrahydrofuran and dioxane; acetate ester solvents, such as ethyl acetate and butyl acetate; nitrile solvents, such as acetonitrile; and amide solvents, such as dimethyl formamide and N-methyl pyrrolidone can be used. The organic solvents may be used alone or in combination of two or more thereof.

In terms of further increasing oil grip properties, softness, and mechanical strength, the weight average molecular weight of the aqueous urethane resin (A) obtained by the above methods is preferably in the range of 30,000 to 1,000,000, and more preferably in the range of 50,000 to 500,000. The weight average molecular weight of the aqueous urethane resin (A) represents a value measured by a gel permeation chromatography (GPC) under the following conditions.

Measurement device: high performance GPC device ("HLC-8220GPC" manufactured by Tosoh Corporation)
Column: the following columns manufactured by Tosoh Corporation were connected in series.
 "TSKgel G5000" (7.8 mm I.D.×30 cm)×1
 "TSKgel G4000" (7.8 mm I.D.×30 cm)×1
 "TSKgel G3000" (7.8 mm I.D.×30 cm)×1
 "TSKgel G2000" (7.8 mm I.D.×30 cm)×1
Detector: RI (refractive index detector)
Column temperature: 40° C.
Eluent: tetrahydrofuran (THF)
Flow rate: 1.0 mL/min
Injection amount: 100 μL (a tetrahydrofuran solution having a sample concentration of 0.4% by mass)
Standard sample: a calibration line was prepared using the following standard polystyrene.
(Standard Polystyrene)
 "TSKgel standard polystyrene A-500" manufactured by Tosoh Corporation
 "TSKgel standard polystyrene A-1000" manufactured by Tosoh Corporation
 "TSKgel standard polystyrene A-2500" manufactured by Tosoh Corporation
 "TSKgel standard polystyrene A-5000" manufactured by Tosoh Corporation
 "TSKgel standard polystyrene F-1" manufactured by Tosoh Corporation
 "TSKgel standard polystyrene F-2" manufactured by Tosoh Corporation
 "TSKgel standard polystyrene F-4" manufactured by Tosoh Corporation
 "TSKgel standard polystyrene F-10" manufactured by Tosoh Corporation
 "TSKgel standard polystyrene F-20" manufactured by Tosoh Corporation
 "TSKgel standard polystyrene F-40" manufactured by Tosoh Corporation
 "TSKgel standard polystyrene F-80" manufactured by Tosoh Corporation
 "TSKgel standard polystyrene F-128" manufactured by Tosoh Corporation
 "TSKgel standard polystyrene F-288" manufactured by Tosoh Corporation
 "TSKgel standard polystyrene F-550" manufactured by Tosoh Corporation In terms of increasing shelf life and workability, the content of the aqueous urethane resin (A) is preferably in the range of 10 to 60% by mass in the aqueous urethane resin composition, and more preferably in the range of 20 to 50% by mass.

As the aqueous medium (B), for example, water, an organic solvent that is miscible with water, and a mixture thereof can be used. As the organic solvent miscible with water, for example, alcohol solvents, such as methanol, ethanol, n-propanol, and isopropanol; ketone solvents, such as acetone and methyl ethyl ketone; polyalkylene glycol solvents, such as ethylene glycol, diethylene glycol, and propylene glycol; alkyl ether solvents, such as polyalkylene polyol; and lactam solvents, such as N-methyl-2-pyrrolidone can be used.

In terms of increasing shelf life and workability, the content of the aqueous medium (B) is preferably in the range of 30 to 85% by mass, and more preferably in the range of 45 to 75% by mass in the aqueous urethane resin composition.

The fluorine compound (C) is a component which is essential for obtaining superior oil grip properties, and in particular, by using the fluorine compound (C-1) or the fluorine compound (C-2), very superior oil grip properties can be achieved.

The fluorine compound (C-1) is a polymer of the polymerizable monomer (c1-1) having a fluorinated alkyl group having 4 to 6 carbon atoms and the polymerizable monomer (c1-2) having a polyoxyethylene structure represented by the general formula (2). The reasons why the use of the fluorine compound (C-1) leads to very superior oil grip properties are presumably that fluorine atoms are liable to be oriented toward the particle surface of the aqueous urethane resin (A) or toward the skin surface and are difficult to remove in a washing step since the polyoxyethylene structure is the only hydrophilic component.

The fluorine compound (C-2) is a polymer of the polymerizable monomer (c2-1) having a polymerizable unsaturated group at both ends of the poly(perfluoroalkylene ether) chain and the polymerizable monomer (c2-2) having a polyoxyalkylene structure represented by the general formula (4). The reason why the use of the fluorine compound (C-2) leads to very superior oil grip properties is presumably that the poly(perfluoroalkylene ether) chain having a structure with contiguous fluorine atoms allows the fluorine atoms to easily exert the effect. In comparison between the (C-1) and (C-2), (C-2) is preferably used in terms of oil grip properties.

The fluorine compound (C-1) or fluorine compound (C-2) is less liable to flow out or fall off in production of a glove because of the relatively low water solubility thereof in addition to the above reasons, and thus can achieve very superior oil grip properties with a small amount.

The content of the fluorine compound (C) is preferably in the range of 0.05 to 10 parts by mass, more preferably in the range of 0.1 to 3 parts by mass, further preferably in the range of 0.3 to 1 parts by mass, and particularly preferably in the range of 0.4 to 0.8 parts by mass based on 100 parts by mass of the aqueous urethane resin (A) (=solid matter).

As the polymerizable monomer (c1-1) having a fluorinated alkyl group having 4 to 6 carbon atoms which is a starting material of the fluorine compound (C-1), for example, a compound represented by the general formula (1) can be used.

[Chem. 3]

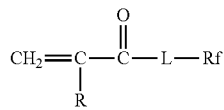
(1)

In the general formula (1), R represents a hydrogen atom, a fluorine atom, a methyl group, a cyano group, a phenyl group, a benzyl group, or —$C_nH_{2n}$—Rf' (n represents an integer of 1 to 8 and Rf' represents any one of the groups of the following formulae (Rf-1) to (Rf-7)), L represents any one of the groups of the following formulae (L-1) to (L-10), and Rf represents any one of the groups of the following formulae (Rf-1) to (Rf-7).

[Chem. 4]

 (L-1)

 (L-2)

 (L-3)

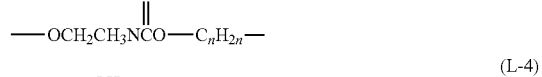 (L-4)

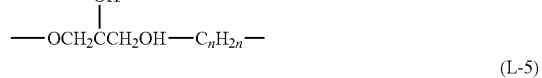 (L-5)

 (L-6)

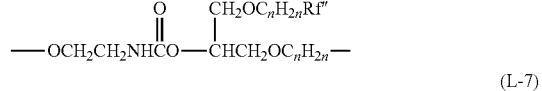 (L-7)

 (L-8)

 (L-9)

 (L-10)

In the formulae (L-1), (L-3), (L-5), (L-6), and (L-7), n represents an integer of 1 to 8, in the formulae (L-8), (L-9), and (L-10), m represents an integer of 1 to 8 and n represents an integer of 0 to 8, and in the formulae (L-6) and (L-7), Rf" represents any one of the groups of the following formulae (Rf-1) to (Rf-7).

[Chem. 5]

 (Rf-1)

 (Rf-2)

 (Rf-3)

 (Rf-4)

 (Rf-5)

 (Rf-6)

 (Rf-7)

In the formulae (Rf-1) to (Rf-4), n represents an integer of 4 to 6, in the formula (Rf-5), m is an integer of 1 to 5 and n is an integer of 0 to 4, provided that the sum of m and n is 4 to 5, and in the formula (Rf-6), m is an integer of 0 to 4, n is an integer of 1 to 4, and p is an integer of 0 to 4, provided that the sum of m, n, and p is 4 to 5.

In terms of obtaining further superior oil grip properties, as the polymerizable monomer (c1-1), those represented by the general formula (1) wherein R is a hydrogen atom or a fluorine atom, L is (L-1) wherein n is an integer of 1 to 4, and Rf is (Rf-1), are preferably used.

The polymerizable monomer (c1-2) has a polyoxyethylene structure represented by the following general formula (2):

[Chem. 6]

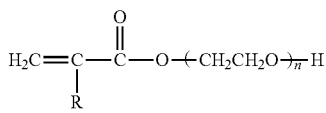

(2)

wherein R represents a hydrogen atom or a methyl group, and n represents an integer in the range of 1 to 30.

In terms of obtaining further superior oil grip properties, as the polymerizable monomer (c1-2), those of the general formula (2) wherein n represents an integer in the range of 5 to 15 are preferably used.

In terms of obtaining further superior oil grip properties, the ratio by mass of the polymerizable monomer (c1-1) to the polymerizable monomer (c1-2) polymerized [(c1-1)/(c1-2)] is preferably in the range of 30/70 to 70/30, and more preferably in the range of 40/60 to 60/40.

In terms of obtaining further superior oil grip properties, the fluorine atom content in the fluorine compound (C-1) is preferably in the range of 1 to 40% by mass, and more preferably in the range of 2 to 35% by mass. The fluorine atom content in the fluorine compound (C-1) represents a value calculated from a ratio by mass of the fluorine atoms relative to the total amount of the polymerizable monomers (c1-1) and (c1-2).

In terms of obtaining further superior oil grip properties, the weight average molecular weight of the fluorine compound (C-1) is preferably in the range of 2,000 to 100,000, and more preferably in the range of 2,500 to 50,000. The weight average molecular weight of the fluorine compound (C-1) is a value calculated in terms of polystyrene based on a GPC measurement. The measurement conditions of GPC are as follows.
[GPC Measurement Conditions]
Measurement device: "HLC-8220 GPC" manufactured by Tosoh Corporation
Column: guard column "HHR-H" (6.0 mm I.D.×4 cm) manufactured by Tosoh Corporation
+"TSK-GEL GMHHR-N" (7.8 mm I I.D.×30 cm) manufactured by Tosoh Corporation
+"TSK-GEL GMHHR-N" (7.8 mm I I.D.×30 cm) manufactured by Tosoh Corporation
+"TSK-GEL GMHHR-N" (7.8 mm I.D.×30 cm) manufactured by Tosoh Corporation
+"TSK-GEL GMHHR-N" (7.8 mm I.D.×30 cm) manufactured by Tosoh Corporation
Detector: ELSD ("ELSD2000" manufactured by Ortec Ltd.)
Data processing: "GPC-8020 model II data analysis version 4.30" manufactured by Tosoh Corporation
Measurement conditions:
 Column temperature 40° C.
 Eluent: tetrahydrofuran (THF)
 Flow rate: 1.0 ml/min
Sample: a tetrahydrofuran solution of 1% by mass in terms of solid matter is filtered with a microfilter (100 μl).
Standard sample: the following monodispersed polystyrenes having known molecular weights are used according to the measurement manual of the "GPC-8020 model II data analysis version 4.30".
(Monodispersed Polystyrene)
 "A-500" manufactured by Tosoh Corporation
 "A-1000" manufactured by Tosoh Corporation
 "A-2500" manufactured by Tosoh Corporation
 "A-5000" manufactured by Tosoh Corporation
 "F-1" manufactured by Tosoh Corporation
 "F-2" manufactured by Tosoh Corporation
 "F-4" manufactured by Tosoh Corporation
 "F-10" manufactured by Tosoh Corporation
 "F-20" manufactured by Tosoh Corporation
 "F-40" manufactured by Tosoh Corporation
 "F-80" manufactured by Tosoh Corporation
 "F-128" manufactured by Tosoh Corporation
 "F-288" manufactured by Tosoh Corporation
 "F-550" manufactured by Tosoh Corporation As the poly(perfluoroalkylene ether) chain, for example, those having a structure with divalent fluorinated carbon groups having 1 to 3 carbon atoms and oxygen atoms that are alternately bound can be used. The divalent fluorinated carbon group having 1 to 3 carbon atoms may be one kind or a mixture of two or more kinds, and specifically, those represented by the following general formula (3) can be used.

(3)

In the general formula (3), X represents the following formulae (S1) to (S5), all X's in the general formula (3) may have the same structure or plural structures may be present in a random or block form, and n which represents a repeating unit number is an integer equal to or more than 1.

[Chem. 7]

(S1)

(S2)

(S3)

(S4)

(S5)

Among them, in terms of obtaining further superior oil grip properties, those having both of a perfluoromethylene structure represented by the formula (S1) and a perfluoroethylene structure represented by the formula (S2) are preferably used. Here, the ratio by mole of the perfluoromethylene structure represented by the formula (S1) to the perfluoroethylene structure represented by the formula (S2) [structure (S1)/structure (S2)] is preferably 1/10 to 10/1 in terms of obtaining superior oil grip properties, and the value of n in the general formula (3) is preferably in the range of 3 to 100, and more preferably in the range of 6 to 70.

In terms of obtaining further superior oil grip properties, in the poly(perfluoroalkylene ether) chain, the total number of the fluorine atoms contained in one poly(perfluoroalkylene ether) chain is preferably in the range of 18 to 200, and more preferably in the range of 25 to 150.

Examples of compounds before introduction of radical polymerizable unsaturated groups to both the ends which are a starting material of the polymerizable monomer (c2-1) include the following formulae (V-1) to (V-6). In each of the following formulae, "-PFPE-" represents the poly(perfluoroalkylene ether) chain described above.

[Chem. 8]

$$HO-CH_2-PFPE-CH_2-OH \quad (V-1)$$

$$HO-CH_2CH_2-PFPE-CH_2CH_2-OH \quad (V-2)$$

$$HO-\overset{O}{\underset{\|}{C}}-PFPE-\overset{O}{\underset{\|}{C}}-OH \quad (V-3)$$

$$HO-\overset{O}{\underset{\|}{C}}-CH_2-PFPE-CH_2-\overset{O}{\underset{\|}{C}}-OH \quad (V-4)$$

$$OCN-PFPE-NCO \quad (V-5)$$

$$H_2C\underset{O}{\overset{\diagdown}{-}}CH-CH_2-O-CH_2-PFPE-CH_2-O-CH_2-CH\underset{O}{\overset{\diagdown}{-}}CH_2 \quad (V-6)$$

Examples of the radical polymerizable unsaturated groups at both the ends of the poly(perfluoroalkylene ether) chain of the polymerizable monomer (c2-1) include radical polymerizable unsaturated groups represented by the following formula (U-1) to (U-4):

[Chem. 9]

$$-O-\overset{O}{\underset{\|}{C}}-CH=CH_2 \quad (U-1)$$

$$-O-\overset{O}{\underset{\|}{C}}-\underset{CH_3}{\overset{|}{C}}=CH_2 \quad (U-2)$$

$$-NH-\overset{O}{\underset{\|}{C}}-CH=CH_2 \quad (U-3)$$

$$-O-\overset{O}{\underset{\|}{C}}-\underset{\underset{\|}{\overset{|}{C}H_2-\overset{|}{C}-OH}}{\overset{|}{C}=CH_2} \quad (U-4)$$

Among these radical polymerizable unsaturated groups, in terms of easy copolymerization with the polymerizable monomer (c2-2) described later, one represented by the formula (U-1) or the formula (U-2) is preferably used.

Examples of methods for producing the polymerizable monomer (c2-1) include a method through a dehydrochlorination reaction of a compound having one hydroxyl group each at both ends of the poly(perfluoroalkylene ether) chain with (meth)acryloyl chloride, a method through a dehydration reaction thereof with (meth)acrylic acid, a method through a urethanation reaction thereof with 2-(meth)acryloyloxyethyl isocyanate, a method through a esterification reaction thereof with itaconic acid anhydride; a method through an esterification reaction of a compound having one carboxyl group each at both ends of the poly(perfluoroalkylene ether) chain with 4-hydroxybutylacrylate glycidyl ether, a method through an esterification reaction thereof with glycidyl (meth)acrylate; a method through a reaction of a compound having one isocyanate group each at both ends of the poly(perfluoroalkylene ether) chain with 2-hydroxyethyl (meth)acrylate, and a method through a reaction thereof with 2-hydroxyethyl (meth)acrylamide. Among them, a method through a dehydrochlorination reaction of a compound having one hydroxyl group each at both ends of the poly(perfluoroalkylene ether) chain with (meth)acryloyl chloride and a method through a urethanation reaction thereof with 2-(meth)acryloyloxyethyl isocyanate are preferred in terms of easy synthesis.

In the present invention, the "(meth)acryloyl group" represents a methacryloyl group and/or an acryloyl group, the "(meth)acrylate" represents methacrylate and/or acrylate, and the "(meth)acrylic acid" represents a methacrylic acid and/or an acrylic acid.

Examples of the polymerizable monomers (c2-1) include those represented by the following formulae (c2-1-1) to (c2-1-10). "-PFPE-" in the following formulae represents a poly(perfluoroalkylene ether) chain.

[Chem. 10]

$$CH_2=CH-\overset{O}{\underset{\|}{C}}-O-CH_2-PFPE-CH_2-O-\overset{O}{\underset{\|}{C}}-CH=CH_2 \quad (c2\text{-}1\text{-}1)$$

$$CH_2=\underset{CH_3}{\overset{|}{C}}-\overset{O}{\underset{\|}{C}}-O-CH_2-PFPE-CH_2-O-\overset{O}{\underset{\|}{C}}-\underset{CH_3}{\overset{|}{C}}=CH_2 \quad (c2\text{-}1\text{-}2)$$

$$CH_2=CH-\overset{O}{\underset{\|}{C}}-O-CH_2CH_2-PFPE-CH_2CH_2-O-\overset{O}{\underset{\|}{C}}-CH=CH_2 \quad (c2\text{-}1\text{-}3)$$

$$CH_2=\underset{CH_3}{\overset{|}{C}}-\overset{O}{\underset{\|}{C}}-O-CH_2CH_2-PFPE-CH_2CH_2-O-\overset{O}{\underset{\|}{C}}-\underset{CH_3}{\overset{|}{C}}=CH_2 \quad (c2\text{-}1\text{-}4)$$

-continued

(c2-1-5)

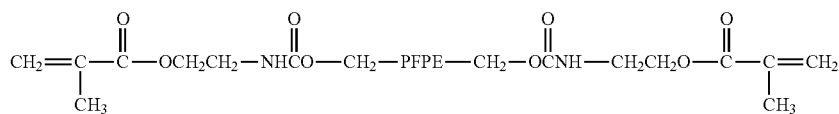
(c2-1-6)

(c2-1-7)

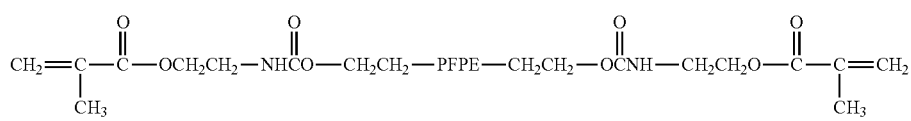
(c2-1-8)

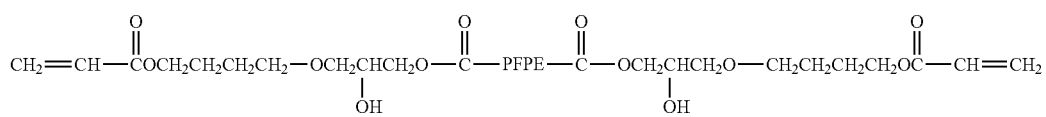
(c2-1-9)

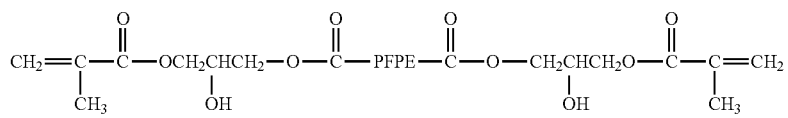
(c2-1-10)

Among them, in terms of production stability of the polymerizable monomer (c2-1), one represented by the formula (c2-1-1), (c2-1-2), (c2-1-5), or (c2-1-6) is preferably used, and in terms of obtaining further superior oil grip properties, those having an acryloyl group at both ends of a poly(perfluoroalkylene ether) chain represented by the formula (c2-1-1) are more preferred.

The polymerizable monomer (c2-2) has a polyoxyalkylene structure represented by the following general formula (4):

[Chem. 11]

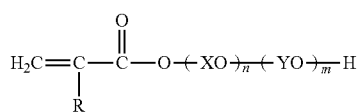
(4)

wherein R represents a hydrogen atom or a methyl group, X and Y each independently represent an alkylene group, and n and m each independently represent 0 or an integer in the range of 1 to 30, provided that the sum of n and m is equal to or more than 1.

X and Y in the general formula (4) are alkylene groups, and the alkylene groups may have a substituent. Specific examples of —O—(XO)n-(YO)m- moieties include ethylene glycol where the repeating unit number n is 1 and m is 0, and X is an ethylene, a propylene glycol where the repeating unit number n is 1 and m is 0, and X is propylene, a butylene glycol where the repeating unit number n is 1 and m is 0, and X is butylene, a polyethylene glycol where the repeating unit number n is an integer of 2 or more and m is 0, and X is ethylene, a polypropylene glycol where the repeating unit number n is an integer of 2 or more and m is 0, and each X is 1-methyl ethylene (propylene), and a polyalkylene glycol, such as a copolymer of ethylene oxide and propylene oxide where the repeating unit numbers n and m are each an integer of 1 or more, and X or Y is ethylene and the other is 1-methyl ethylene (propylene). The polymerization degree of polyalkylene glycol, that is, the sum of n and m in the general formula (4) is preferably in the range of 1 to 50, and more preferably in the range of 2 to 10. The repeating units containing X and the repeating units containing Y may be arranged in a random or block form.

Examples of the polymerizable monomer (c2-2) having the oxyalkylene structure include, when the repeating unit number n is 1 and m is 0, mono(meth)acrylate esters of alkylene glycols, such as ethylene glycol, propylene glycol, and butylene glycol, and the mono(meth)acrylate esters of alkylene glycols in which the end other than the (meth) acrylate ester is terminated by an alkyl group having 1 to 6 carbon atoms, and when the sum of the repeating unit numbers n and m is an integer of 2 or more, mono(meth) acrylate esters of polyalkylene glycols, and the mono(meth) acrylate esters of polyalkylene glycols in which the end other than the (meth)acrylate ester is terminated by an alkyl group having 1 to 6 carbon atoms.

More specific examples of the polymerizable monomer (c2-2) include polypropylene glycol mono(meth)acrylate, polyethylene glycol mono(meth)acrylate, polytetramethylene glycol (meth)acrylate, poly(ethylene glycol-propylene glycol) mono(meth)acrylate, polyethylene glycol-polypropylene glycol mono(meth)acrylate, poly(ethylene glycol-tetramethylene glycol) mono(meth)acrylate, polyethylene glycol-polytetramethylene glycol mono(meth)acrylate, poly (propylene glycol-tetramethylene glycol) mono(meth)acrylate, polypropylene glycol-polytetramethylene glycol mono (meth)acrylate, poly(propylene glycol-butylene glycol) mono(meth)acrylate, polypropylene glycol-polybutylene glycol mono(meth)acrylate, poly(ethylene glycol-butylene glycol) mono(meth)acrylate, polyethylene glycol-polybutylene glycol mono(meth)acrylate, poly(tetraethylene glycol-butylene glycol) mono(meth)acrylate, polytetraethylene glycol-polybutylene glycol mono(meth)acrylate, polybutylene glycol mono(meth)acrylate, poly(ethylene glycol-trimethylene glycol) mono(meth)acrylate, polyethylene glycol-polytrimethylene glycol mono(meth)acrylate, poly(propylene glycol-trimethylene glycol) mono(meth)acrylate, polypropylene glycol-polytrimethylene glycol mono(meth)acrylate, poly(trimethylene glycol-tetramethylene glycol) mono(meth)acrylate, polytrimethylene glycol-polytetramethylene glycol mono(meth)acrylate, poly(butylene glycol-trimethylene glycol) mono(meth)acrylate, and polybutylene glycol-polytrimethylene glycol mono(meth)acrylate. The "poly(ethylene glycol-propylene glycol)" means a random copolymer of ethylene glycol and propylene glycol, and the "polyethylene glycol-polypropylene glycol" means a block copolymer of ethylene glycol and propylene glycol. Among the polymerizable monomers (c2-2), in terms of polymerizability with the polymerizable monomer (c2-1) and oil grip properties, polypropylene glycol mono(meth)acrylate and/or polyethylene glycol mono(meth)acrylate is preferably used.

As the polymerizable monomer (c2-2), for example, "NK ester M-20G", "NK ester M-40G", "NK ester M-90G", "NK ester M-230G", "NK ester AM-90G", "NK ester AMP-10G", "NK ester AMP-20G", and "NK ester AMP-60G" manufactured by Shin-Nakamura Chemical Co. Ltd., "Blemmer PE-90", "Blemmer PE-200", "Blemmer PE-350", "Blemmer PME-100", "Blemmer PME-200", "Blemmer PME-400", "Blemmer PME-4000", "Blemmer PP-1000", "Blemmer PP-500", "Blemmer PP-800", "Blemmer 70PEP-350B", "Blemmer 55PET-800", "Blemmer 50POEP-800B", "Blemmer 10PPB-500B", "Blemmer NKH-5050", "Blemmer AP-400", and "Blemmer AE-350" manufactured by NOF Corporation are available as a commercial products.

In terms of obtaining further superior oil grip properties, the ratio by mass of the polymerizable monomer (c2-1) to the polymerizable monomer (c2-2) polymerized [(c2-1)/(c2-2)] is preferably in the range of 5/95 to 50/50, and more preferably in the range of 10/90 to 40/60.

In terms of obtaining further superior oil grip properties, the fluorine atom content in the fluorine compound (C-2) is preferably in the range of 1 to 40% by mass, and more preferably in the range of 2 to 35% by mass. The fluorine atom content in the fluorine compound (C-2) represents a value calculated from the ratio by mass of the fluorine atoms to the total amount of the polymerizable monomers (c2-1) and (c2-2).

In terms of obtaining further superior oil grip properties, the weight average molecular weight of the fluorine compound (C-2) is preferably in the range of 2,000 to 100,000, and more preferably in the range of 2,500 to 50,000. The weight average molecular weight of the fluorine compound (C-2) represents a value measured in the same manner as for the weight average molecular weight of the fluorine compound (C-1).

The aqueous urethane resin composition used in the present invention contains the aqueous urethane resin (A), the aqueous medium (B), and the fluorine compound (C) as essential components, but may contain other additives as needed.

Examples of other additives that can be used include an association type thickener, an antifoaming agent, an urethanation catalyst, a silane coupling agent, a filler, a thixotropy imparting agent, a tackifier, a wax, a thermal stabilizer, a light stabilizer, a fluorescent brightener, a foaming agent, a foam stabilizer, a thermoplastic resin, a thermosetting resin, a pigment, a dye, a conductivity imparting agent, an antistatic agent, a moisture permeability imparting agent, a water repellant, an oil repellant, a hollow foam, a crystal water-containing compound, a flame retardant, a water absorbent, a moisture absorbent, a deodorizer, an antifungal agent, a preservative, an algae proofing agent, a pigment dispersant, an anti-blocking agent, and a hydrolysis inhibitor. These additives may be used alone or in combination of two or more thereof.

The aqueous urethane resin composition used in the present invention is required to have different durability and softness depending on the use purpose, and may thus contain, for example, a styrene-butadiene copolymer (SBR), a butadiene copolymer (BR), an isoprene copolymer (IR), an ethylene-propylene-diene copolymer (EPDM), a chloroprene polymer (CR), an acrylonitrile-butadiene copolymer (NBR), a butyl polymer (IIR), a natural rubber (NR), or the like.

An example of methods for producing the aqueous urethane resin composition is described below. After obtaining the aqueous urethane resin (A), carboxyl groups in the aqueous urethane resin (A) are neutralized as needed, then the aqueous medium (B) is supplied and mixed to disperse the aqueous urethane resin (A) in the aqueous medium (B). Next, when an organic solvent has been used in production of the aqueous urethane resin (A), the solvent is removed. Then, the fluorine compound (C) and the optional other additives are added and stirred.

In mixing the aqueous urethane resin (A) and the aqueous medium (B), a machine such as a homogenizer may be used as required.

In production of the aqueous urethane resin composition, in terms of increasing dispersibility of the aqueous urethane resin (A) in the aqueous medium (B), the aforementioned emulsifier may be used.

In terms of further increasing workability, the viscosity of the aqueous urethane resin composition is preferably in the range of 50 to 10,000 mPa/s, and more preferably in the range of 1,000 to 3,000 mPa/s. The viscosity of the aqueous urethane resin composition represents a value measured by a Brookfield viscometer at 25° C.

The aqueous urethane resin composition used in the present invention can be used for, besides gloves, medical tubes, such as tubes of catheters.

An Example of methods for producing a glove having a skin produced using the aqueous urethane resin composition is described below. A hand mold or a tube mold is first immersed in a coagulant as described later, and then dried as needed, to attach a metal salt and the like in the coagulant on the surface of the hand mold or the like. Then, the hand mold or the like is immersed in the aqueous urethane resin composition, and then the surface is washed with water and dried to thereby produce a glove having a coagulated skin on the surface of the hand mold or the like.

As the coagulant, for example, a solution of a metal salt, such as calcium nitrate, calcium chloride, zinc nitrate, zinc chloride, magnesium acetate, aluminum sulfate, or sodium chloride; and a solution of an acid, such as formic acid or acetic acid can be used. As a solvent that can dissolve the metal salt and acid, for example, water, methanol, ethanol, and isopropanol can be used. The metal salt contained in the coagulant is preferably contained in the amount of about 1 to 50% by mass relative to the total amount of the coagulant. The time during which the mold to be coated is immersed in the coagulant is preferably about 1 to 10 minutes. The coagulant is preferably used at a temperature of about 5 to 60° C.

The hand mold or tube mold may be at a normal temperature or may be heated to about 30 to 70° C. when immersed in the coagulant. Similarly to the hand mold or the like, the coagulant may be at a normal temperature, but may be heated to about 30 to 70° C. when the hand mold or the like is heated.

On the hand mold or tube mold, a glove-shaped or tube-shaped object previously formed of a knitted material of a nylon fiber or the like may be attached. Specifically, first, a hand mold or the like having a glove-shaped object or the like formed of the knitted material attached is immersed in the coagulant, and then dried as needed to thereby impregnate the glove-shaped object or the like with the coagulant. Then, the hand mold or the like is immersed in the aqueous urethane resin composition, and then the surface is washed with water and dried to thereby form a glove or the like formed of a skin coagulated on the surface of the glove-shaped object or the like, and the glove or the like is peeled from the hand mold and glove-shaped object or the like to obtain the glove or the like formed of the coagulated skin having a shape according to the hand mold or the like. Also in production of a tube as described above, the tube can be produced in the same manner as the above except for using the tube mold and a tube-shaped object formed of a knitted material of a nylon fiber or the like.

The knitted material is not limited to the nylon fiber material, and a material made of a polyester fiber, an aramid fiber, a polyethylene fiber, cotton, or the like can be used. Instead of the knitted material, a woven material formed of such a fiber can be used. Instead of the knitted material, a glove-shaped or tube-shaped object formed of a resin material, such as vinyl chloride, a natural rubber, or a synthetic rubber, can also be used.

In terms of further increasing texture, mechanical strength, and oil grip properties of the glove, the fluorine atom content in the skin obtained by the above method is preferably in the range of 0.01 to 9% by mass, and more preferably in the range of 0.05 to 8% by mass.

The fluorine atom content in the skin represents a value obtained by combusting the skin with an appropriate combustion improver using an automatic sample combustion apparatus, collecting the generated gas into 15 mL of an absorbing liquid, and after combustion, diluting the absorbing liquid as required, and performing a quantification analysis by ion chromatography as described below.

[Analysis Equipment]
(Automatic sample combustion apparatus) "AQF-100" manufactured by Mitsubishi Chemical Analytech Co. Ltd.
(Ion chromatography) "ICS-3000" manufactured by Thermo Fisher Scientific

[Measurement Conditions]
(Automatic Sample Combustion Apparatus)
 Temperature: inlet 1,000° C., outlet 1,100° C.
 Gas flow rate: oxygen 400 mL/min, argon/oxygen 200 mL/min, argon (water supply unit: index 4) 150 mL/min
(Ion Chromatography)
 Separation column: Dicnex IonPac AS18 (4 mm×250 mm)
 Guard column: Dicnex IonPac AG18 (4 mm×50 mm)
 Removing system: AERS-500 (external mode)
 Detector: Electrical Conductivity Detector
 Eluent: potassium hydroxide solution (Eluent Generator EGC iii is used)
 Eluent flow rate 1 mL/min
 Sample injection: 250 µL

[Method for Calculating Fluorine Atom Content]
Entire fluorine content in sample (skin) (% by mass)
=(F⁻ area in measurement solution−intercept of calibration line)/slope of calibration line×
amount of absorbed liquid [mL]×dilution magnification [fold]/(sample amount [mg]/1000)/
10000

(*measurement solution=250 µL of injected sample)

As described above, the glove of the present invention is superior in oil grip properties. In addition, since an aqueous urethane resin composition is used, environmental burdens in production of the glove are also small. Accordingly, the glove of the present invention can be suitably used as an industrial glove for use in various fields, such as the chemical industry field, food field, and medical field.

EXAMPLES

The present invention will be described in detail below with reference to examples.

Synthetic Example 1

Synthesis of Polyester Polyol (a1-1-1)

Into 3 liter flask, 477.5 parts by mass of 1,4-butane diol, 693.5 parts by mass of adipic acid, and 0.06 parts by mass of tetraisopropoxytitanium as an esterified catalyst were added and melted at 120° C. Next, the mixture was heated to 220° C. over 3 to 4 hours with stirring, was maintained for 10 hours, and was cooled to 100° C., thereby preparing a polyester polyol (a1-1-1) (hydroxyl value: 62.3 mg KOH/g).

Synthetic Example 2

Synthesis of Fluorine Compound (C-1-1)

Into a glass flask equipped with a stirrer, a condenser, dropping devices, and a thermometer, 200 parts by mass of toluene was put and heated to 105° C. with stirring under nitrogen gas stream. Next, two dropping liquids, i.e., a monomer solution in which 40 parts by mass of 3,3,4,4,5,5,6,6,7,7,8,8,8-tridecafluorooctyl acrylate (hereinunder abbreviated as "TDFOA") and 60 parts by mass of polyethylene glycol monoacrylate having an average repeating unit number of 10 were dissolved in 125 parts by mass of toluene, and a radical polymerization initiator solution in which 8 parts by mass of t-butylperoxy-2-ethylhexanoate was dissolved in 20 parts by mass of toluene, were respectively placed in the separate dropping devices, and were simultaneously added dropwise over 2 hours into the flask which was maintained at 105° C. After completion of the dropwise addition, the mixture was stirred at 105° C. for 13 hours, and then the solvent was removed by distillation under reduced pressure, so that a fluorine compound (C-1-1) was obtained. The fluorine compound (C-1-1) had a weight average molecular weight of 7,500 and a fluorine atom content of 24% by mass.

Synthetic Example 3

Synthesis of Fluorine Compound (C-2-1)

Into a glass flask equipped with a stirrer, a thermometer, a cooling tube, and dropping devices, 20 parts by mass of a perfluoropolyether compound having a hydroxyl group at both ends represented by the following formula (w-1), 20 parts by mass of diisopropyl ether as a solvent, 0.02 parts by mass of p-methoxyphenol as a polymerization inhibitor, and 3.1 parts by mass of triethylamine as a neutralizer were put, stirring was started under air stream, and 2.7 parts by mass of acryloyl chloride was added dropwise over 1 hour into the flask which was maintained at 10° C. After completion of the dropwise addition, the mixture was stirred at 10° C. for 1 hour, was heated to 30° C., followed by stirring for 1 hour, and then was heated to 50° C., followed by stirring for 10 hours, to thereby conduct a reaction. Gas chromatography measurement confirmed disappearance of acryloyl chloride. Next, washing in a manner that 40 parts by mass of diisopropyl ether was added as a solvent and then 80 parts by mass of ion exchange water was mixed and stirred, followed by still standing to separate and remove the aqueous layer, was repeated three times. Next, 0.02 parts by mass of p-methoxyphenol was added as a polymerization inhibitor, and 8 parts by mass of magnesium sulfate was added as a dehydrating agent, followed by still standing for 1 day for complete dehydration, and then the dehydrating agent was filtered out.

[Chem. 12]

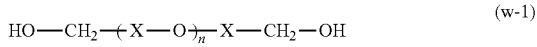

(w-1)

In the formula, X is a perfluoromethylene group or a perfluoroethylene group, 7 perfluoromethylene groups on average and 8 perfluoroethylene groups on average are present in one molecule, and the number of fluorine atoms are 46 on average, and the number average molecular weight by GPC is 1,500.

Next, the solvent was removed by distillation under reduced pressure, so that a polymerizable monomer having a poly(perfluoroalkylene ether) chain represented by the following formula (W-1) with acryloyl groups at both ends was obtained.

[Chem. 13]

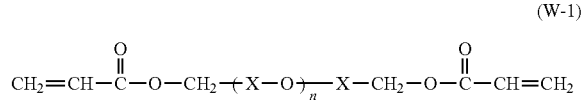

(W-1)

In the formula (W-1), X is a perfluoromethylene group or a perfluoroethylene group, 7 perfluoromethylene groups on average and 8 perfluoroethylene groups on average are present in one molecule, and the number of fluorine atoms is 46 on average.

Next, into a glass flask equipped with a stirrer, a condenser, dropping devices, and a thermometer, 300 parts by mass of methyl isobutyl ketone was put, and the mixture was heated to 105° C. with stirring under nitrogen gas stream. Next, three dropping liquids, i.e., 60 parts by mass of a polymerizable monomer represented by the formula (W-1), a monomer solution in which 238 parts by mass of polypropylene glycol monomethacrylate (manufactured by NOF Corporation "Blemmer PP-1000", repeating number of oxypropylene units: 6 on average) was dissolved in 154 parts by mass of methyl isobutyl ketone, and a radical polymerization initiator solution in which 45 parts by mass of t-butylperoxy-2-ethylhexanoate was dissolved in 100 parts by mass of methyl isobutyl ketone, were respectively placed in separate dropping devices, and were simultaneously added dropwise over 2 hours into the flask which was maintained at 105° C. After completion of the dropwise addition, the mixture was stirred at 105° C. for 10 hours, and then the solvent was removed by distillation under reduced pressure, so that a fluorine-based copolymer (C-2-1) was obtained, which was a fluorine-based surfactant. The fluorine compound (C-2-1) had a weight average molecular weight of 6,000 and a fluorine atom content of 11% by mass.

Comparative Synthetic Example 1

Synthesis of Fluorine Compound (C')

Into a glass flask equipped with a stirrer, a condenser, dropping devices and a thermometer, 200 parts by mass of toluene was put and was heated to 105° C. with stirring under nitrogen gas stream. Next, two dropping liquids, i.e., a monomer solution in which 10 parts by mass of TDFOA and 90 parts by mass of polyethylene glycol polypropylene glycol monoacrylate having an oxyethylene moiety of an average repeating unit number of 11 and an oxypropylene moiety of an average repeating unit number of 22 were dissolved in 125 parts by mass of toluene and a radical polymerization initiator solution in which 8 parts by mass of t-butylperoxy-2-ethylhexanoate was dissolved in 20 parts by mass of toluene, were respectively placed in separate dropping devices, and were simultaneously added dropwise over 2 hours into the flask which was maintained at 105° C. After completion of the dropwise addition, the mixture was stirred at 105° C. for 13 hours, and then the solvent was removed by distillation under reduced pressure, so that a fluorine compound (C-1) was obtained. The fluorine compound (C-1) had a weight average molecular weight of 11,200 and a fluorine atom content of 5.9% by mass.

Preparation Example 1

Preparation of Aqueous Urethane Resin Composition (X-1)

In a container equipped with a thermometer, a nitrogen gas introducing tube, and a stirrer and purged with nitrogen, 900 parts by mass of the polyester polyol (a1-1-1), 18.6 parts by mass of ethylene glycol, 40.2 parts by mass of dimethylolpropionic acid, and 275.1 parts by mass of diphenylmethane diisocyanate were reacted at 70° C. in the presence of 824 parts by mass of methyl ethyl ketone as an organic solvent.

When the viscosity of the reaction mixture reached a defined value, 2 parts by mass of methanol was added and stirred for 1 hour to complete the reaction, and 686.7 parts by mass of methyl ethyl ketone was added as a dilution solvent, thereby obtaining an organic solvent solution of a urethane resin (A-1).

Next, to the organic solvent solution of the urethane resin (A-1), 30.3 parts by mass of triethylamine was added as a neutralizer and the mixture was stirred, and 4120.6 parts by mass of water (B-1) was further added and the mixture was stirred, thereby obtaining a water dispersion of a urethane resin (A-1). Next, the solvent was removed from the water dispersion of the urethane resin (A-1), thereby obtaining an aqueous urethane resin composition having 35% by mass of nonvolatile components containing water (B-1).

Next, into 100 parts by mass of the obtained aqueous urethane resin composition, 0.2 parts by mass of the fluorine compound (C-1-1) obtained in Synthetic Example 2 was added and the mixture was stirred for 30 minutes, thereby obtaining an aqueous urethane resin composition (X-1).

Preparation Examples 2 to 4

Preparation of Aqueous Urethane Resin Compositions (X-2) to (X-4)

Aqueous urethane resin compositions (X-2) to (X-4) were obtained in the same manner as in Preparation Example 1 except that the kind and amount of the fluorine compound (C) used were changed as shown in Table 1.

Example 1

A knitted glove of a nylon fiber was attached to a hand mold, was immersed in 20% by mass of a calcium nitrate aqueous solution for 15 seconds, and then was lifted up. Then, in the aqueous urethane resin composition (X-1) whose viscosity was previously adjusted to 400 mPa/s (Brookfield viscometer, 30 rpm) with carboxymethyl cellulose, the hand mold was immersed for 0.5 minutes to form a coagulated skin of the aqueous urethane resin composition (X-1) on the surface of the knitted glove, and was then lifted up. Then, the hand mold was immersed into water for 60 minutes and was lifted up. Next, the hand mold was sequentially dried at 70° C. for 20 minutes and at 120° C. for 30 minutes. Next, the knitted glove was removed from the hand mold to obtain a glove having a skin. The skin had a fluorine atom content of 0.13% by mass.

Example 2, Comparative Examples 1 to 2

A glove was obtained in the same manner as in Example 1 except that the kind of the aqueous urethane resin composition used was changed as shown in Table 1.

[Method for Evaluation of Oil Grip Properties]

On the outer surface of a square timber of 15 cm×7 cm×2.5 cm, a release paper ("EK-100D" manufactured by Lintec Corporation) was attached in a manner that the releasing surface was on the outer side and that the weight was 320 g. A 1-kg weight was suspended therefrom with a string to assemble a device. Then, a thumb and an index finger that put on a glove obtained in each of Examples and Comparative Examples were immersed in an oil ("BM-1K" manufactured by Osawa Wax Co., Ltd.), and then the square timber was taken at a center portion which is 4 cm from the upper end from the front and rear sides with the thumb and index finger and lifted up. At this time, if the square timber was lifted up with the weight, the glove was evaluated as having good oil grip properties. In addition, after the square timber was lifted up, the time (sec) until the square timber slid down was measured, and a glove showing a longer time was evaluated as having better oil grip properties.

TABLE 1

|  | Example 1 | Example 2 | Comparative Example 1 | Comparative Example 2 |
| --- | --- | --- | --- | --- |
| Aqueous urethane resin (A) | (A-1) | (A-1) | (A-1) | (A-1) |
| Aqueous medium (B) | (B-1) | (B-1) | (B-1) | (B-1) |
| Fluorinated compound (C) | (C-1-1) | (C-2-1) | (C') | none |
| Content (parts by mass based on 100 parts by mass of aqueous urethane resin (A)) | 0.57 | 0.57 | 1.14 | 0 |

TABLE 1-continued

|  | Example 1 | Example 2 | Comparative Example 1 | Comparative Example 2 |
| --- | --- | --- | --- | --- |
| Aqueous urethane resin composition | (X-1) | (X-2) | (X-3) | (X-4) |
| Fluorine atom content in skin (mass %) | 0.13 | 0.06 | 0.07 | 0 |
| Fluorine atom content in fluorine compound (C) (mass %) | 24 | 11 | 5.9 | — |
| Oil grip properties (sec) | 15 | 17 | 10 | not lifted |

Examples 1 to 2 which were the gloves of the present invention were found to be superior in oil grip properties.

On the other hand, Comparative Example 1, which was a case where compounds other than (C-1) and (C-2) were used as the fluorine compound (C), was found to be insufficient in the oil grip properties.

Comparative Example 2, which was a case where no fluorine compound (C) was used, showed significantly poor oil grip properties.

The invention claimed is:

1. A glove having a skin made from an aqueous urethane resin composition comprising an aqueous urethane resin (A), an aqueous medium (B), and a fluorine compound (C), a content of the fluorine compound (C) being in the range of 0.05 to 10 parts by mass based on 100 parts by mass of the aqueous urethane resin (A), the fluorine compound (C) being a fluorine compound (C-1) that is a polymer of a polymerizable monomer (c1-1) having a fluorinated alkyl group having 4 to 6 carbon atoms and a polymerizable monomer (c1-2) having a polyoxyethylene structure represented by general formula (2):

[Chem. 1]

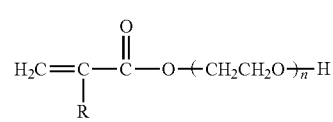
(2)

wherein, R represents a hydrogen atom or a methyl group, and n represents an integer in the range of 1 to 30, or a fluorine compound (C-2) that is a polymer of a polymerizable monomer (c2-1) having a polymerizable unsaturated group at both ends of a poly(perfluoroalkylene ether) chain and a polymerizable monomer (c2-2) having a polyoxyalkylene structure represented by general formula (4):

[Chem. 2]

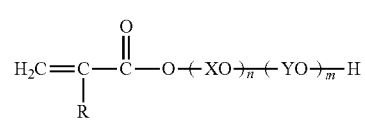
(4)

wherein, R represents a hydrogen atom or a methyl group, X and Y each independently represent an alkylene group, and n and m each independently represent 0 or an integer in the range of 1 to 30, provided that the sum of n and m is equal to or more than 1.

2. The glove according to claim 1, wherein the fluorine compounds (C-1) and (C-2) each have a fluorine atom content in the range of 1 to 40% by mass.

3. The glove according to claim 1, wherein the fluorine compounds (C-1) and (C-2) each have a weight average molecular weight in the range of 2,000 to 100,000.

4. The glove according to claim 1, wherein the aqueous urethane resin (A) is an aqueous urethane resin having an anionic group.

5. The glove according to claim 1, wherein the fluorine compounds (C-1) and (C-2) each have a fluorine atom content in the range of 1 to 40% by mass.

* * * * *